United States Patent [19]

Sinnott

[11] 3,999,090

[45] Dec. 21, 1976

[54] STEPPER MOTOR

[75] Inventor: Richard C. Sinnott, Menlo Park, Calif.

[73] Assignee: CRS, Berkeley, Calif.

[22] Filed: Sept. 30, 1975

[21] Appl. No.: 618,028

[52] U.S. Cl. .............................. 310/49 R; 310/154
[51] Int. Cl.² ...................................... H02K 37/00
[58] Field of Search ..................... 310/49, 162–165, 310/268, 154, 155; 518/685, 696

[56] References Cited

UNITED STATES PATENTS

| 3,456,138 | 7/1969 | Huber | 310/49 |
| 3,596,119 | 7/1971 | Goldmann | 310/49 |
| 3,644,764 | 2/1972 | Newell | 310/49 |
| 3,757,147 | 9/1973 | Lyman, Jr. | 310/49 |
| 3,783,313 | 1/1974 | Mathur | 310/49 |
| 3,845,335 | 10/1974 | Oguey | 310/49 |
| 3,860,842 | 1/1975 | Schwab et al. | 310/49 |

Primary Examiner—Donovan F. Duggan
Attorney, Agent, or Firm—Allan R. Fowler

[57] ABSTRACT

A unidirectional direct rotary stepper motor is adapted to step its rotor between successive stable rest positions in response to successive electrical pulses of opposite polarity. The motor includes a rotor having a central hub portion and a plurality of annularly aligned similar blades, an energizing coil, and a core which passes through the energizing coil and has a first pole face disposed in close relationship with the rotor hub portion, and a second spaced-apart pole face disposed in close relationship with the rotor blades. An annular array of similar permanent magnets of sequential opposite polarity is disposed on the surface of the core pole opposing the rotor blades in serial intervention in the coil flux path.

2 Claims, 8 Drawing Figures

STEPPER MOTOR

This invention relates to electromagnetic rotary step-by-step motors adapted to directly magnetically step the rotor of the motor between successive stable rest positions in response to successive electrical pulses, hereinafter called direct rotary stepper motors to distinguish them from electromagnetic devices which step by means of actuating a mechanical ratchet. The invention has particular reference to new unidirectional direct rotary stepper motor designs incorporating large and closely opposed surface areas in the active ingredient structure which permit unique latitude in the realization of desirable performance characteristics while allowing efficient use of electrical power, and while utilizing structure of simple geometry permissive of inexpensive construction and miniaturization of the motor.

In general, the electric motor is very old, well developed and stratified along defined lines for different types of motors, and any significant fundamental improvement expanding further on these conventional designs is now difficult to come by. Moreover, while electric motors bear the commonality of utilizing general electromagnetic principles, different types of electric motors, such as direct rotary stepper motors and AC synchronous motors, are specialized practical adaptations emphasizing different aspects and applications of these principles. Hence the physical geometry of one type of motor doesn't necessarily teach you much about the desirable geometry of a different type, because the function, utilization and complex interrelation of structure and electromagnetic forces on either a static or dynamic basis may be and usually is very different despite any superficial similarity.

For example, as exemplified in U.S. Pat. No. 3,356,876, the AC synchronous motor is a gross-effect dynamic device relying as well on rotational inertia, and therein lies its utility as well as the ability to make simplified and low cost versions thereof. Its design centers around electrodynamic considerations causing it to come up to speed and run smoothly and efficiently at continuous rotation in close synchronism with the applied AC frequency. While concern is given to getting it started in the right direction, this is only an incident to its useful operation and must not seriously interfere with the basic design parameters serving the main purpose. On the other hand, as exemplified in U.S. Pats. Nos. 3,541,363 and 3,693,034, conventional direct rotary stepper motor must be able to move, not only in the right direction, but in small angular increments from one stable position to the next in response to discrete electrical pulses, including pulses spaced apart in time either on a regular or an irregular basis, and characteristically has to start and stop for each position of which there are many in one revolution. All of its important operating characteristics are tied up in the details of its performance during this relatively small angular increment of start and stop movement responsive to an electrical pulse and in the stability of its rest position in which no operating current may be applied for some time. Hence, the details of its active magnetic structure are all controlling to a very exacting degree, and generally are arrived at empirically, being quite complex regardless of superficial appearances.

Generally, direct rotary stepper motors are used in industrial applications because, when designed to suitable performance characteristics, power requirements and size for general application to consumer products, even when this is possible, they are usually too expensive to justify. For example, many automobile clocks are notoriously short lived and unreliable, and some are quite noisy; yet, so far as is known to date, because of the expense involved, no commonly available automobile clock utilizes a conventional direct rotary stepper motor, even though by comparison it should be phenominally reliable and durable for this purpose, and also very quiet. Essentially the same is true for example for common wrist watches, as opposed to extremely expensive wrist watches, because of the expense as further compounded by the necessary miniaturization. Hence, the general public consumer as well as the industrial buyer in many potentially helpful areas of application, isn't enjoying the benefits of direct rotary stepper motor technology.

First and foremost therefore, in aid of this situation, is the object of combining in a single device the necessary combination of elements to achieve a relatively inexpensive direct rotary stepper motor having not only the realization of suitable performance characteristics, but also affording the ability and flexibility to tailor them handily and to comply with the voltage and electric power consumption specifications and scaled sizes for general application to ordinary consumer products. This implies the enhancement of and ready control of appropriate starting torque, running torque and holding torque on a short term start and stop basis. It also implies high efficiency, simple geometric shapes, minimum number of essential parts, low rotor inertia, dependable unidirectional movement, the use of inexpensive materials, and a design which eases magnet and structural construction tolerances to facilitate low cost manufacturing by conventional mass production methods. These are competing design characteristics, where conventionally to solve one may be and usually is to defeat another.

My invention represents a major step toward the achievement of this object and the solution of these problems, and is in the form of a new combination of structural and electromagnetic features which, so far as known, have never heretofore been combined in a direct rotary stepper motor.

In accordance with my invention, a direct rotary stepper motor is adapted to step unidirectionally between successive stable rest positions in response to successive electrical pulses of opposite polarity. The motor includes a rotor having a high magnetic permeability, the rotor in turn including a central hub portion and a portion of annularly aligned similar blade portions spaced around and extending from the hub portion. The rotor is mounted for rotation about a central axis whereby, upon rotation, the loci of one side of the blades define an annular surface of revolution about the axis. A core of high magnetic permeability passes through the center of an energizing coil, and has first and second spaced apart opposite polarity poles disposed about the axis and proximate to the rotor for concentrating the magnetic flux generated by the coil responsive to the application of electrical pulses to the coil, and for efficiently passing coil flux through the rotor. The first pole of the core has a surface thereon disposed in opposed, proximately spaced and parallel relationship with the rotor hub portion so as to form a gap therebetween of minimum magnetic reluctance. The second pole of the core has a surface thereon disposed in opposed, proximately spaced and parallel relationship with the annular surface of revolution defined by the loci of the rotor blades. An annular array of similar permanent magnets is disposed on this proximate surface of the second pole of the core in serial intervention in the coil flux path between the second pole and the rotor blades. Each permanent magnet has opposite parallel pole faces respectively disposed on opposite sides of the annular array, with the magnet pole faces on one side thereof being in engagement with the mentioned surface of the second pole of the core, and with the magnet pole faces on the opposite side thereof being exposed and being disposed in opposed, proximately spaced and parallel relationship with the annular surface of revolution so as to form a spacing of minimum magnetic reluctance between the exposed magnet pole faces and the rotor blades. Each permanent magnet in the annular array is magnetized along the direction normal to its opposite parallel pole faces, which also is the direction normal to the annular surface of revolution and the mentioned surface of the second pole of the core. Adjacent permanent magnets in the annular array have opposite polarity so that the magnet pole faces are alternate north and south poles around the array.

Measured parallel to the annular surface of revolution, the rotor blades are sized and spaced circumferentially relative to the proximate magnet pole faces to produce successive stable rest positions for the rotor wherein each blade partially overlaps a different pair of adjacent magnet pole faces and provides a primary magnet flux path closure or bridge therebetween. These overlapped pairs of adjacent magnet pole faces have the same polarity sequence in the direction of rotation around the annular array, which polarity sequence reverses at each successive rest position.

Further the rotor blades proximate magnet pole faces are of dissimilar shape selected to produce substantially in excess of half the angular rotation of the rotor between successive stable rest positions resposive to the application to the coil of electric current of a polarity which enhances the field of magnets overlapped by the leading edges of blades, and to oppose such rotation in the opposite direction upon the application to the coil of electric current of the polarity which enhances the field of the magnets overlapped by the trailing edges of the blades. In this regard, leading and trailing refer to the designed direction of rotation of the rotor.

Thus in accordance with the present invention, the motor features a sandwich-like or intimately layered arrangement of magnetically interacting surfaces centered on an axis of rotation to afford maximum effective exposure to one another and minimum magnetic reluctance in the coil flux path. This construction permits the use of a thin annulus of permanently magnetizable material in which the permanent magnets may be formed, thus facilitating the serial interposition of the magnets in the coil flux path while minimizing the added reluctance of such interposition, thereby allowing low power consumption applications for the motor while retaining good torque characteristics.

Because of this arrangement, and because of the use of the permanent magnets of successive alternate polarity with the rotor blades magnetically bridging between adjacent magnet pole forces of opposite polarity in the successive rest positions of the rotor, the device particularly lends itself to ready tailoring and realization of desirable torque and directional characteristics by selection of the relative shape for the rotor blades and magnet pole faces. Further, this arrangement permits of relatively inexpensive construction and assembly, simple geometric structure and miniaturization of the motor. The motor, therefore, is adaptable to many areas of use of importance to general public consumers.

The foregoing arrangement of structural and electromagnetic features, together with other important aspects and advantages of the invention, will become more apparent from the following detailed description of an exemplary embodiment of the invention depicted in the accompanying drawings, in which:

FIG. 3 is a top plan view of the assembled stepper motor, particularly illustrating the relative size, circumferential spacing and shape of the rotor blades and the exposed magnet pole faces, with the rotor shown in a stable rest position;

FIG. 4 is an enlarged fragmentary view illustrating the positioning of a single rotor blade with respect to successive magnetic pole faces as the blade moves from an initial rest position to its next sequential rest position;

Figure 7:
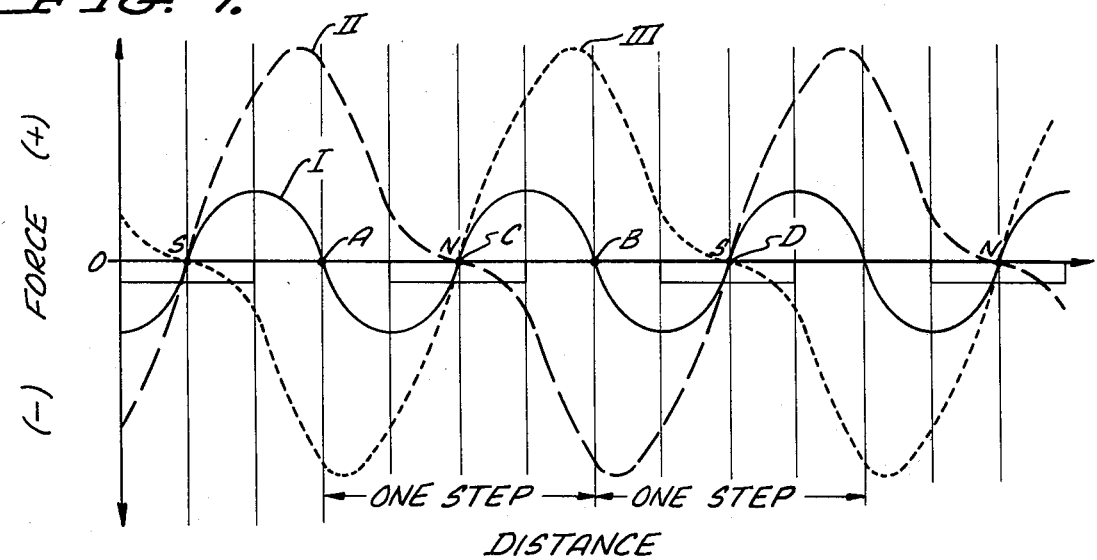
Figure 8:
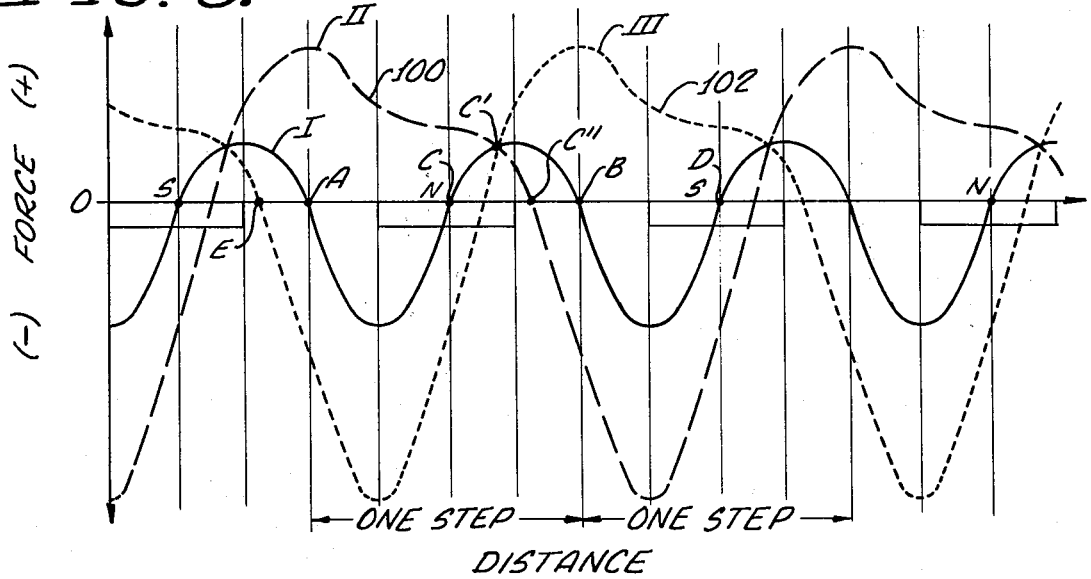

FIG. 7 is a schematic diagram illustrating qualitatively the net static force on a rectangular rotor blade having a stable width as it passes over successive rectangular magnet poles of opposite polarity; and, FIG. 8 is a qualitative diagramatic plot similar to FIG. 7, illustrating the change in the forces acting on the blade as a result of tailoring the shape of the blade relative to the rectangular magnet pole faces.

Figure 1:
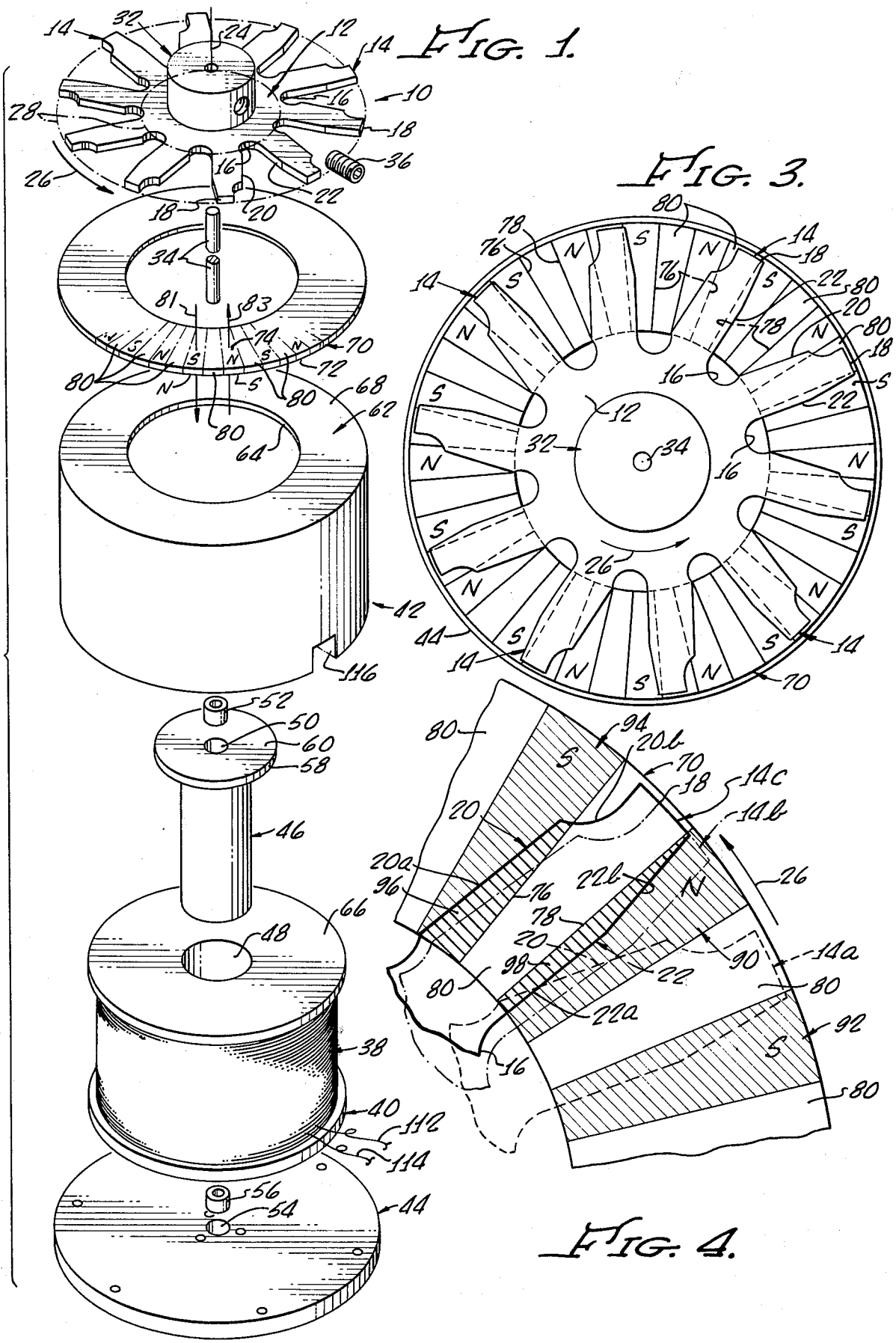
FIG. 1 is an exploded perspective view, partially broken away, of the major components of the exemplary embodiment of the stepper motor of the invention.
Figure 2:
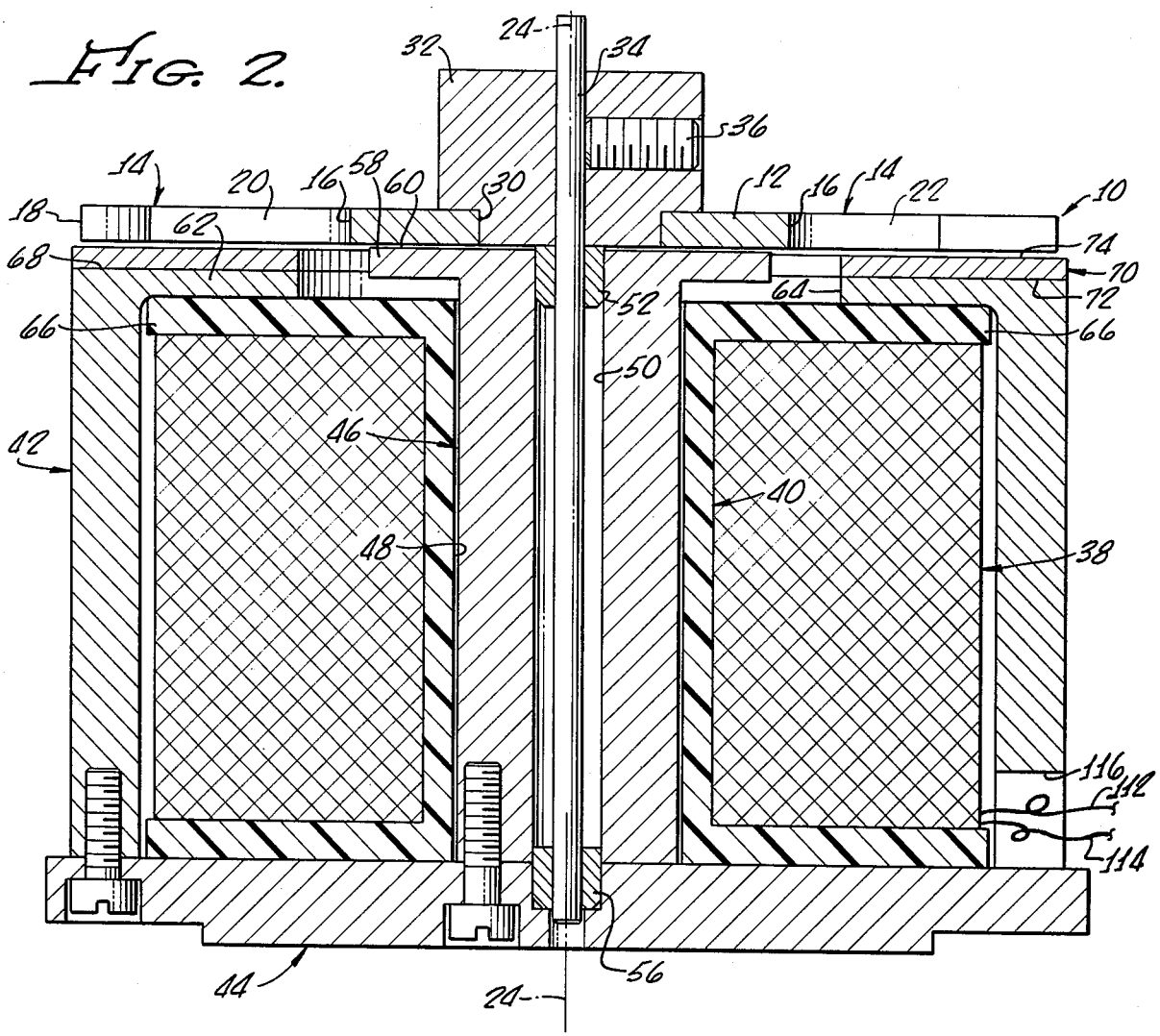
FIG. 2 is a sectional elevation of the assembled stepper motor of FIG. 1.

Referring now to the drawings, particularly FIGS. 1 and 2, the stepper motor includes a flat rotor 10 cut or stamped from thin sheet metal having a high magnetic permeability, such as soft iron or low carbon steel. The rotor has a flat and approximately circular central hub portion 12, and a plurality of annularly aligned similar blade portions 14 spaced around and extending outwardly from the hub portion 12. Typically each blade has a root 16 which defines the outer perimeter of the central hub portion, a tip 18, a leading edge 20 and a trailing edge 22. Leading and trailing is with reference to the designed direction of rotation about a central axis 24 which lies normal to the rotor hub portion 12 at its center, the designed direction of rotation being indicated by an arrow 26. Upon rotation about the axis 24, the loci of the underside of the rotor blades define an annular surface of revolution 28 as indicated by the phantom lines in FIG. 1.

The central hub portion 12 of the rotor has a central opening 30 therein into which a mounting boss 32 is press fitted, thus solidly securing it to the door. The mounting boss 32 is made of a high magnetic permeability material such as soft iron or low carbon steel, and fits flush with the bottom side of the central hub portion 12 while protruding from the top side thereof. The mounting boss in turn has a small central bore therethrough coaxial with the axis 24 through which a motor shaft 34 is press fitted and further locked by means of a set screw 36, so as to rigidly secure the motor shaft to the rotor through the mounting boss 32, with the shaft extending normal to the hub 12 of the rotor and coaxially with the axis 24.

The motor has an energizing coil 38 wound about a spool 40 of non-magnetic (low magnetic permeability) material such as plastic. The spool 40, on which the coil 38, is mounted on a core structure of high magnetic permeability material such as soft iron or low carbon steel, which core structure consists of an outer hollow cylindrical member 42, a bottom circular plate member 44, and a central cylindrical member 46 which extends through the coil. These core members may be connected together in any conventional manner, such as by screws as illustrated. The spool 40 has a central opening 48 therethrough which closely matches the outer diameter of the central core member 46 so that the spool fits snugly thereon, with both the central core member and spool, hence the coil 38, being coaxially disposed on the axis 24. The central core member has a relatively small central bore 50 therethrough, and a bronze bearing 52 is press-fitted into the top end thereof, the bore and bearing being coaxial with the axis 24. In line therewith, the bottom plate 44 of the core has an opening 54 therein into which is press-fitted a second bronze bearing 56. The rotor 10 is mounted for rotation about the axis 24 by inserting the motor shaft 34 through the upper and lower bronze bearings 52, 56 until the mounting boss 32 rests on the top of the upper bearing 52.

The core serves to concentrate the coil flux and pass it through the rotor. Electromagnetically, the top of the central center core member 46 forms a first or central pole of the core structure, whereas the top of the outer cylindrical core member 42 forms a second or opposite pole of the core structure.

In this regard, the central core member 46 has an enlarged upper end 58 on top of which is formed a pole face 60 in the form of a flat circular surface disposed in opposed, proximately spaced and parallel relationship with the underside of the rotor hub portion 12, so as to form a uniform gap therebetween of minimum magnetic reluctance. The central hub portion 12 of the rotor constitutes a substantial part of the surface area of the rotor, exemplary thereof being the approximate diameter of the hub portion, as measured between the roots 16 of the rotor blades, exceeds the length of each blade as measured from root to tip of the blade. The flat circular pole face 60 is approximately of equal extend as the rotor hub portion, and since the upper bronze bearing 52 is of relatively small diameter and is centrally located, and since the mounting boss 32 is of high magnetic permeability material and is flush with the underside of the rotor hub, substantially the entire circular area encompassed by the rotor hub on its underside is opposed to and fully exposed magnetically to the flat pole face 60. The close spacing between these surfaces is controlled by the upper bronze bearing 52, which protrudes slightly, for example about 0.005 inches above the face 60 of the central or first core pole. This arrangement of large surface areas and close spacing minimizes the reluctance and maximizes the magnetic coupling between the central or first pole of the core structure and the rotor.

The opposite or second pole of the core structure is formed at the top of the outer cylindrical core member 42 with the aid of an inwardly turned flange 62. This is an annular flange disposed coaxially with the central core member 46. The inner circumference 64 of the flange 62 is substantially spaced from the outer circumference of the enlarged upper end 58 of the central core member to create a large magnetic reluctance gap therebetween. Also, this flange 62 is substantially spaced from the top of the coil 38 by a top flange 66 on the plastic spool 40, so as to create a large magnetic reluctance gap therebetween. This helps insure high reluctance isolation of the opposite poles of the core so that substantially all of the coil flux passes through the rotor.

The pole faces of the second or opposite pole of the core is in the form of a flat annular surface 68 defining the top of the outer core member 42 and its inwardly turned flange 62, the surface essentially surrounding and being parallel to and coaxial with the flat surface 60 forming the pole face of the central member 46. This flat annular surface 68 approximately matches and is of equal or greater extent as the annular surface of revolution defined by the loci of the rotor blades, and is disposed in coaxially opposed, proximately spaced and parallel therewith.

An annular array of permanent magnets, the pole faces of which are designated N and S for North and South, is formed in a single thin piece of material shaped as a thin flat annulus 70. This thin flat annulus 70, in the exemplary embodiment of the invention, is formed of an inexpensive low magnetic permeability material, Plastiform BX-1013, manufactured by or for Minnesota Mining and Manufacturing Company of Saint Paul, Minn. U.S.A., in a thickness of about 0.03 inches. This material includes barium ferrite in a flexible binder.

As is apparent in FIG. 2, the bottom side 72 of the flat annulus 70 containing the permanent magnets matches and is disposed on the surface of the second pole face 68 of the core. The annulus 70 is in serial intervention in the coil flux path between this second pole face 68 and the rotor blades 14. The top surface 74 of the flat annulus 70 of permanently magnetizable material is disposed proximate to in directly opposed and parallel relationship with the annular surface of revolution 28 formed by the loci of the underside of the rotor blades 14, so as to form a minumum magnetic reluctance spacing therebetween which, in the exemplary embodiment of the invention, is on the order of 0.01 inches.

As best depicted in FIGS. 1, 3 and 4, an annular array of similar permanent magnets as represented by the magnet pole faces shown as areas designated N and S are formed in and through the body of the annulus 70. Typically, each permanent magnet has opposite parallel pole faces disposed on opposite sides 72, 74 of the annulus 70, such that the length of each permanent magnet is the small thickness of the flat annulus 70 and the area dimensions of each magnet pole face are large compared to the magnet length. Like the rotor blades, typically each permanent magnet formed in the annulus 70 has a leading edge 76 and a trailing edge 78 relative to the designed direction of rotation of the rotor as indicated by the arrow 26, these edges being straight and lying on radii from the axis of rotation 24 of the rotor. The shape of each magnetic pole face, particularly as represented by the leading and trailing edge thereof, is sharply defined magnetically; and, in the exemplary embodiment of the invention, the unmagnetized spacing 80 between adjacent magnets in the annulus 70 is correspondingly identical in size and shape to a permanent magnet.

As best illustrated in FIG. 1, each permanent magnet in the annular array is magnetized along the direction normal to its opposite parallel pole faces (indicated as N and S on opposite sides of the annulus 70), with adjacent permanent magnets in the annular array having opposite polarity so that the magnet pole faces on each side of the annulus 70 are alternate North and South poles around the annulus. This is illustrated by the arrows 81, 83 in FIG. 1 which run along the direction normal to the flat annulus 70 but which point oppositely along this direction, each arrow pointing from South to North as is conventional in indicating the polarity of a magnetic field.

The pole faces of the permanent magnets on the underside 72 of the flat annulus 70, being in surface engagement with the flat annular face 68 of the second pole of the core are shunted magnetically by the high magnet permeability material forming the second pole of the core. This enhances the magnetic field strength available from the permanent magnets at the top surface 74 of the flat annulus 70. It is desirable to place the annulus 70 of permanently magnetizable material onto the annular pole face 68 at the time the permanent magnets are formed in the annulus 70. The permanent magnets are formed in the annulus 70 conventionally by juxtaposition therewith of electromagnets (not shown) having core faces of the desired shape of the resulting permanent magnets in the annulus 70, then passing a suitable current through the coils of the electromagnets.

As best seen in FIGS. 3, and 4, the exposed magnet pole faces are radial surface segments of the flat annulus 70, and the roots, tips, leading and trailing edges of the blades 14 generally define the size, shape and spacing of the blades in the direction parallel to the surface of the annulus 70, which is also the direction parallel to the magnet pole faces and to the surface of revolution defined by the loci of the blades upon rotation thereof.

The rotor blades 14 are sized and spaced circumferentially relative to the exposed magnet pole faces N, S to produce successive stable rest positions for the rotor wherein each blade partially overlaps a different pair of exposed adjacent magnet pole faces of opposite polarity and provides a primary magnet flux path or bridge therebetween. The overlapped pairs of adjacent pole faces have the same polarity sequence in the direction of rotation around the annular array, shown as South-North in the particular rest position depicted in FIG. 3. When the rotor steps to its next sequential rest position, as indicated by the rotor blade 14c in FIG. 4, the polarity sequence reverses and becomes North-South. Thus, the leading edges 20 of the blades overlap a magnet pole face first of one polarity then of the opposite polarity in the successive rest positions of the rotor, with the trailing edges 22 of the blades overlapping adjacent magnet pole faces of polarity opposite to the polarity of those overlapped by the leading edges.

The magnitude of the holding force on the rotor in its rest position is reflected strongly by the width of each blade relative to the width and circumferential spacing of the magnet pole faces. This is illustrated approximately and qualitatively by the diagram of FIG. 6, which depicts spaced-apart North and South magnetic pole faces N, S and first and second rotor blades 82, 84 of different widths shown centered between the magnet pole faces. It is assumed that the magnet pole faces are fixed, that the first and second blades 82, 84 are free to move only along the abscissa or distance axis of the diagram, and that this is an edge view with the blade and pole faces being symmetric, for example rectangular and having parallel edges in the direction normal to the plane of the figure. The left hand curve 86 represents the static force resulting from the North magnet pole face acting on leftwardly approaching blades 82, 84 as represented at the position of the blades edges 82a and 84a of the respective blades 82 and 84, this force being directed to the left and tending to pull the blades toward and over the North pole face N. Correspondingly, the right hand curve 88 represents the static force keyed to the position of the right hand edges 82b, 84b of the respective blades 82, 84, this force being directed toward the right and tending to pull the blades toward and over the South magnetic pole.

Figure 6:
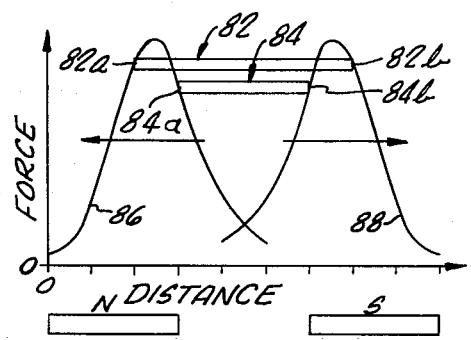
FIG. 6 is a schematic diagram of forces acting on a rectangular rotor blade positioned intermediate rectangular North and South magnetic pole forces illustrating the effect of blade width relative to the magnetic pole faces in regard to the stability of the blade's position.

Considering now the first blade 82 in FIG. 6, if it is moved to the right in the figure, its left hand edge 82a will approach alignment with the top of the left force curve 86, thus increasing the left hand force acting on the blade, and its right edge 82b will align itself with a lower point on the right force curve 88, thus decreasing the force on the blade tending to pull it to the right. The net effect is that the static holding forces acting on the blade will oppose any movement of the blade to the right. Conversely, by inspection it can be seen that these static forces will also oppose any movement of the blade to the left. Hence, the first blade 82 is of a stable width, and any force moving it from its centered position will be opposed by the static forces from the North and South magnet poles.

On the other hand, the second blade 84, which is much narrower, does not find a stable rest position centered between the magnet poles. For example, a small movement of the blade to the right will cause the static force to the right on the blade to increase and to the left to decrease, and the blade will continue to move to the right until it finds equilibrium over the South pole. Conversely, the same is true if the blade is initially moved responsive to an external force in the left direction, in that the static forces from the adjacent magnet pole faces of opposite polarity will be in aid of continued left movement until the blade 84 reaches a position of equilibrium over the North magnetic pole.

The holding forces, or the static forces from the permanent magnetics which tend to hold the rotor in a rest position, are of course necessary to prevent turning of the rotor due to applied external forces. The net holding force acting on a stable symmetric rotor blade, that is, for example, a rectangular blade with edges parallel to each other and parallel to the edges of the properly overlapped adjacent magnets of opposite polarity, is shown in FIG. 7 as the holding force curve I. This holding force curve represents the net force on the blade due to the permanent magnet fields alone.

In this diagram, FIG. 7, positive force is in the direction toward the right, negative force is directed towards the left, and the force curves, shown qualitatively illustrate the static force action on a blade as it is physically moved in position. Successive stable or rest positions of the blade are shown at positions A and B, and represent the position of the center of a symmetric blade. With no external magnetic field applied, the blade is stable at positions A and B because, if displaced to the left, a net positive holding force results that acts to push the blade back toward the right, and the reverse is true if the blade is displaced to the right. This is true of course unless the blade is displaced so far as to center on a magnet, positions C or D, which lie approximately at the center of the magnetic poles. At these points, the blade is in an unstable position and could move therefrom in either direction.

When a North magnetic field is applied to the array of permanent magnets, shown in FIG. 7, a field which enhances the field of the North poles and opposes that of the South poles, the net total force on the symmetric blade is shown by a dashed curve II. A blade at a stable rest position A, when such a North magnetic field is applied, will experience a net positive force or a force to the right in FIG. 7, urging the blade to move to the right. So long as the North field is applied, the blade will continue to experience a force to the right until it reaches the point C in FIG. 7 where the blade is approximately centered over the North pole magnet N and has in fact been moved one-half the distance between stable rest positions A and B. At this position C, the blade is stable as long as the applied North magnetic field is present. However, when the applied North magnetic field is removed, the force on the blade reverts to the holding force I, shown in solid line, and the blade finds itself in an unstable position at this point C from which it could move in either direction, either backward to point A or forward to point B to achieve a stable rest position. Moreover, the blade would also be unstable at position C in FIG. 7 if the applied North magnetic field were reversed to a South magnetic field instead of being removed, as can be seen from inspection of the dotted or short dashed curve III in FIG. 7, which represents the net force on a symmetric blade resulting from an applied South magnetic field. Hence, the symmetric blade does not sustain unidirectional movement and of course cannot carry a load in a given direction. Further, it may start its movement in either direction depending upon the polarity of the applied magnetic field.

FIG. 8 is similar to FIG. 7 in that is shows approximately and qualitatively a holding force curve I, a net force curve II resulting from an applied North magnetic field in aid of the North magnetic poles and opposed to the South magnetic poles, a net force curve III resulting from the application of an opposite or South magnetic field, successive stable rest positions A and B depicting approximately the position of the center of a stable blade whose edges properly overlap the adjacent magnetic pole faces in a rest position, and unstable positions C and D corresponding to the unstable positions C and D shown in FIG. 7, where the approximate center of the blade is positioned over the center of a magnet pole face. The curves in FIG. 8 are only instructive qualitatively; however, they are of different shape than the corresponding curves in FIG. 7 because of the magnet pole faces and blades are selected to have a different shape; that is, they are not symmetric.

As seen in FIG. 8, the holding force curve I is different than in FIG. 7 but has the same general effect of producing stable rest positions A and B and unstable rest positions C and D when no external magnetic field is applied. In FIG. 8, however, a non-symmetirc blade at a stable rest position A, with a North magnetic field applied in aid to the North poles and in opposition to the South poles, will experience a net positive force as represented by the dashed curve II causing it to want to move to the right. So long as this applied field remains, the blade will continue to experience a net positive force to the right until it reaches a crossover point C' and further, absent a contrary load force, until the North curve II goes to zero at the point C''. It will be noted that the rightward movement from point A to point C' or to point C'' is, in either case, substantially greater than half the distance between successive rest positions A and B; that is, it is substantially greater than the distance between positions A and C. If at points C' or C'' the applied North magnetic field is removed, the static holding force curve I asserts a net positive force on the blade continuing to urge the blade to the right to its next stable rest position B; moreover, the same is true if the applied magnetic field is not removed but is reversed in polarity as indicated by the short dashed curve III. Thus, the ordinate to the point C', the crossover point of the three curves in FIG. 8, represents a rightward directed force available to enable the blade to carry a load, that is available as a contribution toward running torque in the stepper motor.

Further, as demonstrated in FIG. 8, the blade steps only in designed direction to the right regardless of the polarity of the applied magnetic field. For example, a blade centered in rest position A, upon the application of a South magnetic field as represented by the short dashed curve III, experiences a net negative or leftward force urging it to move to the left until it reaches point E where this curve III passes to zero. Further movement to the left causes the net force, even under the influence of a South applied magnetic field, to become positive hence rightwardly directed. By inspection, it can be seen that, if at any time during this small leftward movement, the applied South magnetic field were reversed or removed, the blade would be urged to the right because of the positive force represented by either the North polarity curve II or the holding force curve I.

The graphs in FIGS. 6, 7 and 8 are only qualitative, approximate and illustrative, and are static representations as opposed to a dynamic representation of the forces acting on a blade. However, they do serve to illustrate the effect of both size (particularly width) and circumferential spacing of blades, relative to magnet poles, and the importance of factors which can be introduced when the blades and magnet poles are selected to have appropriate different shapes measured parallel to the plane of relative motion.

As in any stepper motor, the tailoring of any one characteristic tends to affect all of the others; and, it is a compromise that must be achieved for practical purposes.

Comparing FIGS. 7 and 8, for example, that is comparing a symmetrical with an asymmetrical relative shape between blades and magnet poles, the asymmetrical shape depicted in this embodiment of the invention tends to lower the starting torque from any rest position, as represented by the positive ordinates to the North and South applied magnetic field force curves II and III at the stable rest positions A and B, while at the same time raising the crossover point of these curves (C in FIG. 7, and C' in FIG. 8), while as well moving this crossover point to the right (in the designed direction of rotation). The latter two of course, as reflected in this embodiment of the invention by asymmetric blade shape, account for the unidirectional characteristics of the motor as well as its ability to carry a significant load.

Notably, the points at which the holding force curve crosses the zero force axis of FIGS. 7 and 8 are approximately the same regardless of blade shape for a proper and stable blade width, although the holding force curve otherwise significantly changes in magnitude, basically toward the negative. Moreover, although not demonstrated, increasing the applied magnetic field, regardless of polarity, that is increasing the coil current of the motor, will affect the height and depth of the peaks of the North and South applied magnetic field curves II and III; however, this does not significantly affect the holding force curve I nor materially affect location of the crossover points where the applied field curves II and III intersect the holding force curve.

Referring now to FIG. 4, a single step of the stepper motor is illustrated by a blade 14a starting at a rest position as shown in dotted line, moving through an angle of rotation of approximately 15° to a position 14b as represented in phantom line, all as a result of the application of an applied North magnetic field which enhances the field of a magnet 90 having a North exposed magnetic pole face overlapped by the leading edge 20 of the blade in the position 14a and which opposed the magnetic field of a magnet 92 overlapped by the trailing edge 22 of the blade in the position 14a. When the North applied magnetic field is removed, the blade moves from the position 14b, shown in phantom line, to the position 14c shown in solid line, an angular movement of about 3° or moderately more.

If, in the solid line position of the blade as shown at 14c, a North magnetic field enhancing the trailing North pole 90 and opposing the leading South pole 94 overlapped by the blade in this position was applied, the blade would move contrary to the direction of intended rotation as represented by the arrow 26, back about 3° or so near the phantom line position 14b, but no further; and, shortly it would return to the solid line position 14c when the applied North magnetic field was removed. On the other hand, a South magnetic field applied when the blade is in the solid line position 14c would cause the blade to step all the way to its next sequential rest position in the designed direction of rotation, as represented by the arrow 26.

In this rest position, the blade as represented in solid line at 14c has a leading edge 20 which overlaps the leading edge 76 of the South pole of the magnet 94, the overlap being defined by a bold cross-hatch area 96. At the same position 14c, the trailing edge 22 of the blade overlaps the trailing edge 78 of the adjacent North pole magnet 90 in an area 98 shown in bold cross-hatch. The areas of overlap 96 and 98 are approximately equal, and in general the average width of the blade, from root to tip, significantly exceeds the non-magnetic space 80 between the pole faces of the magnets 90, 94, with the blade being roughly centered with respect to the space 80 between the magnets such that it forms, because of its close spacing and high magnetic permeability, a major shunt or bridge for the magnetic field passing from the North pole magnet 90 to the South pole magnet 94 in this rest position.

Also, depiction in FIG. 8 of the rest position 14c of this exemplary blade illustrates the basic difference in shape between the similar blades and the similar magnetic pole faces in the exemplary embodiment of the invention. As seen in FIG. 4, the trailing edge 22 of the blade extends approximately parallel to the trailing edge 78 of the overlapped North pole magnet 90. In detail, about half 22a of the trailing edge 22 of the blade, extending from the root 16 of the blade toward the tip 18 thereof, is parallel to the straight radial trailing edge 78 of the North pole magnet 90, whereas the other half 22b of the trailing edge 22 of the blade departs from parallelism by extending at a small angle in the designed direction of rotation of the blade. Relating this to the applied magnetic field force curves II and III in FIG. 8, the forward directed outer portion 22b of the trailing edge 22 of the blade accounts for a raising of what otherwise would be a much more pronounced dip 100, 102 in these curves.

The leading edge 20 of the blade in position 14c is generally oriented askew at a considerable lagging angle relative to the radial direction represented by the leading edge 76 of the South pole magnet 94, lagging being meant to indicate pointing angularly backward relative to the designed direction of rotation 26. About two-thirds 20a of this leading edge 20 of the blade is relatively straight, but askew as described, and the remaining outer one-third 20b of the leading edge 20 of the blade, approaching the tip 18 of the blade, defines an arcuate notch in the blade near the tip thereof causing this portion of the blade to be further askew in the lagging direction relative to the designed rotation of the blade.

Basically, it is this shape of the leading edge 20 of the blade which, as related to the curves in FIG. 8, accounts for the lowering of the positive amplitudes of the force curves and for the increase in the negative amplitudes, as well as for the moving of the crossover points of the curves to the right and upward as indicated at C' in FIG. 8, which in turn accounts for the directional and load capacity aspects of the motor.

Figure 5:
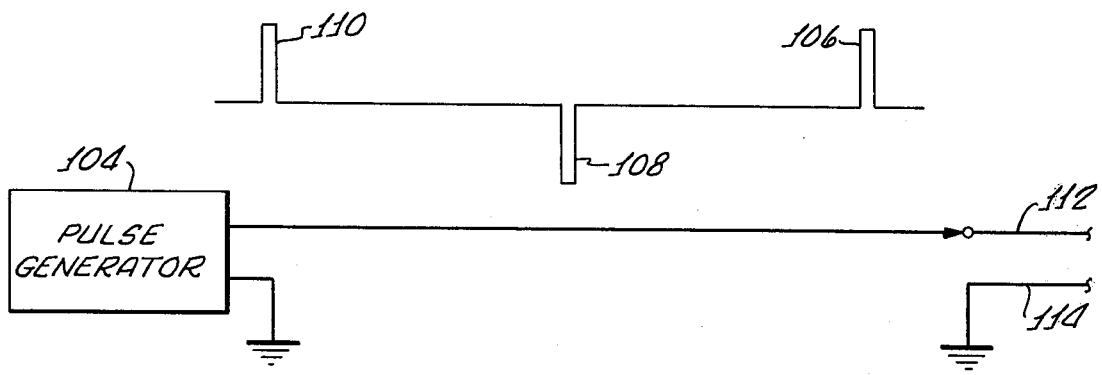
FIG. 5 is a circuit diagram with accompanying wave forms depicting the operation of a pulse generator for emitting pulses of opposite polarity to drive the stepper motor.

Referring now to FIG. 5, a stepper motor of about 1 ⅝ inches overall diameter constructed in accordance with the description herein, which represents a prototype motor actually constructed in the labortory for testing purposes, typically is driven by a pulse generator 104 which emits successive alternate positive and negative pulses 106, 108, 110 at about one second intervals to cause the motor to step from one successive rest position to the next. The pulse generator 104 is electrically connected to leads 112, 114 of the energizing coil 38, which are available externally of the motor through a slot 116 formed at the bottom of the outer cylindrical core member 42. Responsive to alternate positive and negative electrical pulses supplied from the pulse generator, the energizing coil 38 produces magnetic fields of corresponding opposite polarity to drive the stepper motor step-by-step in the designed direction of rotation.

As a typical example, these are 5 volt pulses of about 62.5 millisecond duration, resulting in an average current to drive the motor of about 500 microamperes at a power consumption of about 0.0025 watts. Conservatively, such a motor produces about 0.35 ounce-inches static starting torque, 0.18 ounce-inches static holding torque, and about 0.1 ounce-inches dynamic running torque. And, this is typical of only a crude test prototype using very inexpensive materials. Obviously the performance can be significantly improved with little effort and expense through the routine application of conventional technology.

One of the most important aspects of the invention involves the physical geometry of the parts both mechanically and magnetically in combination which, even for a small size motor, results in a significantly large, simple and closely spaced sandwich-like structure of overlapping highly active magnetic surfaces, through which substantially the entire coil flux is efficiently passed to step the motor. For example, as part of this designed efficiency, the roots 16 of the blades in the rotor are recessed relative to the inner perimeter of the permanent magnet annulus 70, to make the blades more active; that is, so that the hub of the rotor does not readily afford a partial shunt between adjacent opposite polarity magnet pole faces.

Because of this arrangement of cooperating mechanical and magnetic features, there is a much larger degree of latitude than is present in conventional stepper motor designs for comprising between holding, starting and running torques for a given power input for given cost criteria.

For example, for the arrangement illustrated and described, it is a relatively simple matter to construct the rotor blades and magnet faces of a dissimilar shape, selected to produce substantially in excess of half the angular rotation of the rotor between successive stable rest positions responsive to the application to the coil of electrical current of a polarity which enhances the field of the magnets overlapped by the leading edges of the blades, and to oppose such rotation in the opposite direction in the event of application to the coil of electric current of a polarity which enhances the fields of the magnets overlapped by the trailing edges of the blades in the rest position.

Also, it will be noticed that the permanent magnet annulus 70, because of its permanent magnets, holds itself to the annular pole face 68 of the outer cylindrical core member 42 and requires no further support. Further, the fields of the permanent magents hold the rotor in position, with the top of the upper bearing 52 resisting the thrust of this force. It is easy to change the characteristics of the motor simply by removing the rotor, by pulling it away from the motor freely, and replacing it with a different rotor having blades of different shape and or number to meet different desired performance characteristics for a particular application.

It is of course the "relative" shape and circumferential spacing of the magnets and rotor blades which are readily controllable to modify the performance characteristics of the motor, as opposed to the shape of either singularly. However, in view of the structural and magnetic arrangement of features in the exemplary embodiment of the invention, there is sufficient latitude afforded in tailoring these features that they can be readily controlled by the simple expedient of modifying blade shape alone.

It is intended that the exemplary stepper motor disclosed herein in detail be taken as illustrative only of the invention, and not limiting of it in any manner. For example, the flat construction depicted in the drawings could as well be a cylindrical construction where the rotor blades were bent downwardly and the annular surface of revolution, defined by the loci of the blades during rotation, constituted a cylindrical annular surface as opposed to a flat annular surface.

I claim:

1. A unidirectional step by step motor adpated to step between successive stable rest positions in response to successive electrical pulses of opposite polarity, comprising:
   a rotor having a high permeability, the rotor including a central hub portion and a plurality of annularly aligned similar blade portions spaced around and extending from the hub portion;
   means mounting the rotor for rotation about a central axis of rotation whereby, upon rotation, the loci of one side of the blades define an annular surface of revolution about said axis;
   an energizing coil for generating magnetic flux responsive to the application of electrical pulses;
   means defining a core of high magnetic permeability which passes through the center of said coil and has first and second spaced apart opposite polarity poles disposed about said axis and proximate to the rotor for concentrating the coil flux and passing coil flux through the rotor;
   the first pole of said core having a surface thereon disposed in opposed, proximately spaced and parallel relationship with the rotor hub portion so as to form a gap therebetween of minimum magnetic reluctance;
   the second pole of said core having a surface thereon disposed in opposed, proximately spaced and parallel relationship with said annular surface of revolution defined by the loci of the blades;
   means defining an annular array of similar permanent magnets each having opposite parallel pole faces respectively disposed on opposite sides of the annular array and each being magnetized in the direction normal to its pole faces, said magnets being arranged with adjacent magnets in the annular array having opposite polarity;
   said annular array of similar permanent magnets being disposed on said surface of the second pole of the core in serial intervention in the coil flux path between said second pole and the rotor blades, with the magnet pole faces on one side thereof being in engagement with said surface of the second pole of the core, and with the magnet pole faces on the opposite side thereof being exposed and disposed in opposed, proximately spaced and parallel relationship with said annular surface of revolution so as to form a spacing of minimum magnetic reluctance between the exposed magnet pole faces and the rotor blades;
   the rotor blades having roots and tips, and having leading and trailing edges relative to the designed direction of rotation, all of which generally define the size, shape and spacing of the blades as measured parallel to said surface of revolution;
   said plurality of rotor blades being sized and spaced circumferentially relative to the exposed magnet pole faces to produce successive stable rest positions for the rotor wherein each blade partially overlaps a different pair of exposed adjacent magnet pole faces and provides a primary magnetic flux path therebetween, with said overlapped pairs of adjacent pole faces having the same polarity sequence in the direction of rotation around the annular array, which polarity sequence reverses at each successive rest position; and,
   the rotor blades and magnet pole faces being of dissimilar shape selected to produce substantially in excess of half the angle rotation of the rotor between successive stable rest positions responsive to the application to the coil of electrical current of a polarity which enhances the field of the magnets overlapped by the leading edges of the blades, and to oppose such rotation in the opposite direction upon the application to the coil of electrical current of a polarity which enhances the field of the magnets overlapped by the trailing edges of the blades.

2. The motor of claim 1, in combination with means for generating electrical pulses of opposite polarity to energize the coil thereof to generate magnetic flux of corresponding opposite polarity, said pulses having a peak current many times the average current thereof.

* * * * *

UNITED STATES PATENT AND TRADEMARK OFFICE
CERTIFICATE OF CORRECTION

PATENT NO.   : 3,999,090
DATED        : December 21, 1976
INVENTOR(S)  : Richard C. Sinnott It is certified that error appears in the above–identified patent and that said Letters Patent are hereby corrected as shown below:

Column 1, Lines 12-13, change "ingredient" to --magnetic--;
Line 19 after "motor" insert --art--; Line 56 after "each" insert -- such --.
Column 3, Line 36 after "blades" insert --and--; Line 64 change "forces" to --faces--.
Column 4, Line 35 change "forces" to --faces--; Line 66 change "door" to --rotor--.
Column 5, Line 35 after "core" insert --structure--; Line 49 after "being" insert --that--; Line 54 change "extend" to --extent--.
Column 6, Line 20 after "flat" insert --circular--; Line 21 after "central" insert --core--; Line 26 after "parallel" insert --relation--.
Column 9, Line 58 delete "of".
Column 11, Line 2 change "of" to --in--.
Column 13, Line 18 after "magnet" insert --pole--; Line 33 change "magents" to --magnets--; Line 66 change "high permeability" to --high magnetic permeability--.
Column 14, Line 60 change "angle rotation" to --angular rotation --.

Signed and Sealed this

Twenty-sixth Day of April 1977

[SEAL]

Attest:

RUTH C. MASON
Attesting Officer

C. MARSHALL DANN
Commissioner of Patents and Trademarks